No. 609,338. Patented Aug. 16, 1898.
J. L. FARLEY.
ANIMAL TRAP.
(Application filed June 1, 1897.)
(No Model.) 2 Sheets—Sheet 1.

Witnesses
Mark L. Byng
Victor J. Evans

Inventor
Jeptha L. Farley
By John Wedderburn Attorney

No. 609,338. Patented Aug. 16, 1898.
J. L. FARLEY.
ANIMAL TRAP.
(Application filed June 1, 1897.)
(No Model.) 2 Sheets—Sheet 2.
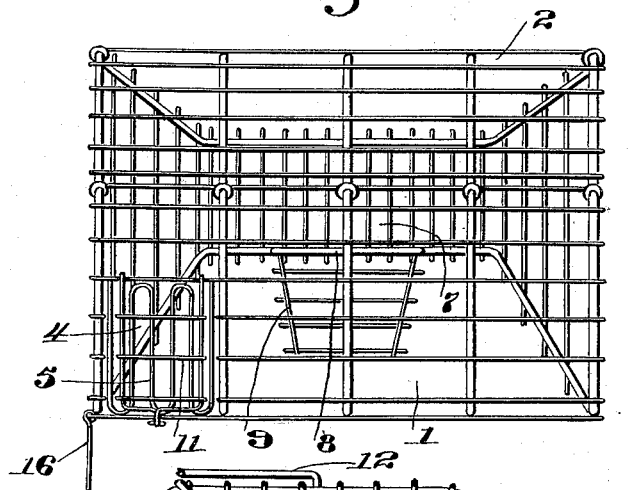
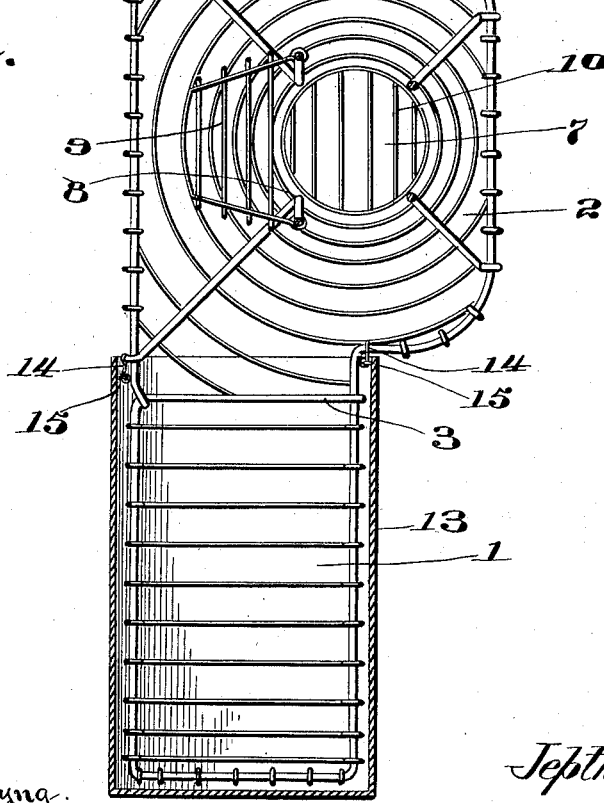
Witnesses
Mark L. Byng.
Victor J. Evans.
Inventor
Jeptha L. Farley
By John Wedderburn, Attorney

UNITED STATES PATENT OFFICE.

JEPTHA L. FARLEY, OF DE SOTO, MISSOURI.

ANIMAL-TRAP.

SPECIFICATION forming part of Letters Patent No. 609,338, dated August 16, 1898.

Application filed June 1, 1897. Serial No. 638,865. (No model.)

*To all whom it may concern:*

Be it known that I, JEPTHA L. FARLEY, of De Soto, in the county of Jefferson and State of Missouri, have invented certain new and useful Improvements in Animal-Traps; and I do hereby declare the following to be a full, clear, and exact description of the invention, such as will enable others skilled in the art to which it appertains to make and use the same.

This invention relates to improvements in animal-traps, and has special reference to traps which are adapted for small animals, as rats and mice, the object of this invention being to provide a simple trap so constructed that the mice and rats will readily enter the same and when once within their passage therefrom is prevented.

The invention also relates to the provision of an attachment for use with the trap for the purpose of drowning the rats or mice imprisoned within the same.

The invention consists in the novel details of construction hereinafter fully described, claimed, and illustrated by the accompanying drawings, in which—

Figure 1:
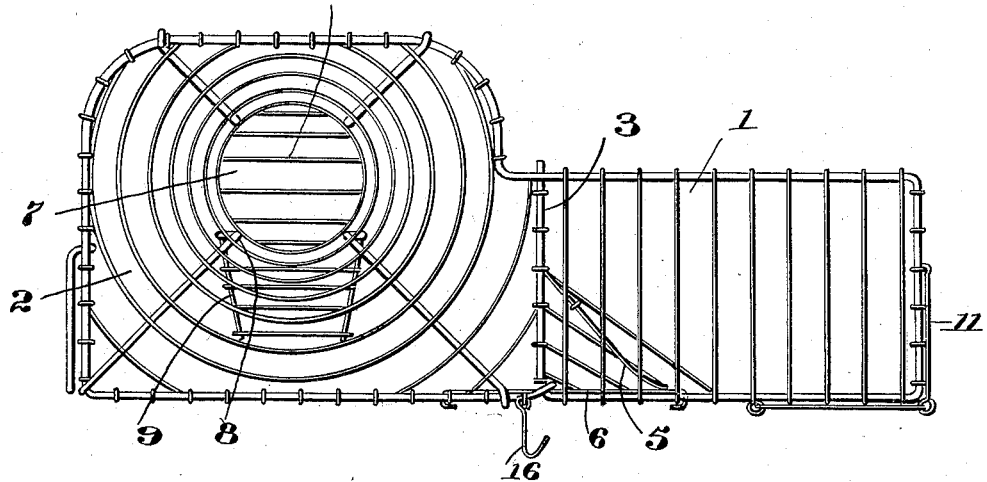
Figure 3:
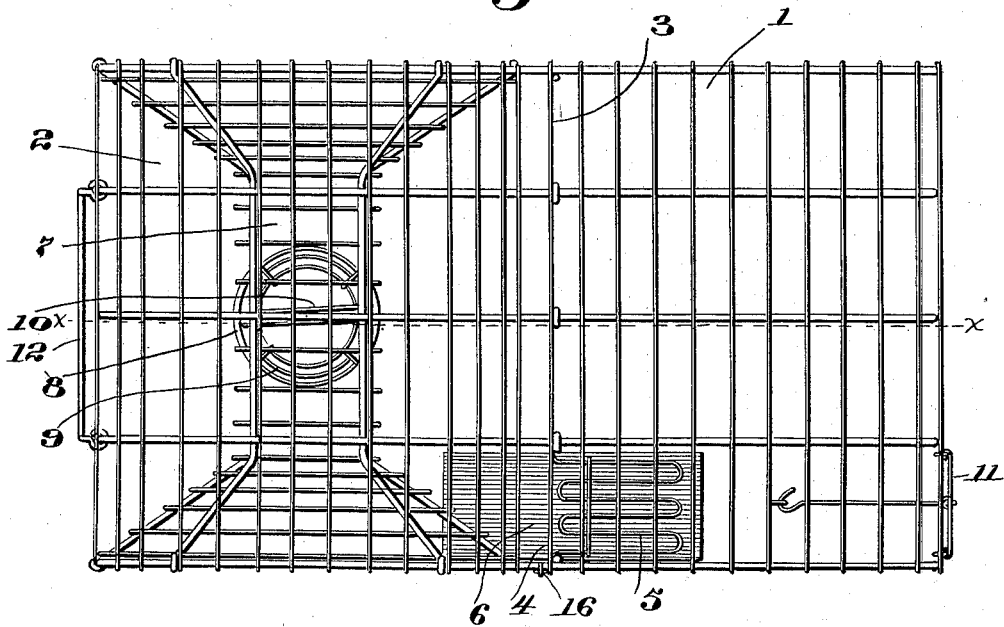

Figure 1 is a side elevation. Fig. 2 is a front elevation. Fig. 3 is a top plan view. Fig. 4 is a longitudinal vertical sectional view taken on the line $xx$ of Fig. 3, showing the drowning attachment in position.

The trap consists of the compartments 1 and 2, which are separated by a partition 3, said partition being provided with an opening 4 adjacent one end, by means of which communication is established between the two compartments. 5 is a gate for controlling said opening, said gate being pivoted adjacent its upper end and inclined downwardly with its extremity engaging a plate 6, which is secured in the bottom wall of the trap for the purpose of preventing the lower end of the gate from engaging the wires which comprise the bottom of the trap and its free movement being obstructed thereby. This gate may be opened by the mouse or rat within the compartment 2 to permit the passage of the animal into the compartment 1, and a reverse movement of the gate is prevented by reason of its lower end engaging the plate, as will be understood. A guard is preferably arranged at one side of the gate, as shown, to prevent the rodents from escaping under the gate.

The compartment 2 is enlarged upwardly, as illustrated, and positioned centrally within said compartment is the transverse compartment 7, which is open at each end, as illustrated. The end walls of the compartment 2 incline toward the open ends of this compartment or passage-way, so as to make each end substantially funnel shape. This passage-way or compartment is provided with an opening 8 in its bottom wall adjacent its center, and secured at its upper end to the edges of said opening is the downwardly-extending casing 9, having its walls converging toward their lower end and terminating a short distance from the bottom wall of the compartment 2. A partition 10 extends transversely of the passage or compartment 7 and extends across the center of the opening 8, so that mice or rats passing into this passage-way or compartment will be prevented from passing out at either end, but yet will be permitted to pass downward into the compartment 2. A door 11 is provided in the end of compartment 1, through which the animals may be removed after they have been drowned or through which they may be permitted to pass should it be desired to remove them alive from the trap. A bail 12 is provided, whereby the trap may be carried from place to place, as may be desired.

The operation of my invention is as follows: The trap is first set squarely against and at right angles to the wall of a building, box, or other like structure, so that the entrance-passage 7 will be parallel with the wall, and the animals running along the wall, as is their habit, will have no trouble in finding the entrance to the trap. In fact the entrance will be directly in their path of movement and it would be difficult for them to avoid it. The bait is placed in the compartments 1 and 2, and the animals attracted thereby will enter the passage-way and pass down into the compartment 2. When once within this compartment, their passage upward into the passage-way 7 and out is practically cut off, as the downwardly-extending casing 9 is located in the center of the compartment, and the animals, through ignorance, will go all around this casing and try the outer edges of the trap, but will not pass beneath the center of the casing and try to go upward therethrough. They then pass into the compartment 1, lifting the gate by pressure and are imprisoned in said compartment, as it is impossible to open the gate from that side. By reason of having the passage-way open at both ends the impression is conveyed to the animals that they can pass in at one end and out at the other, the partition being of wire, so that it does not appear as an obstruction. By having the walls inclined adjacent each open end of the passage-way the animals are much more readily induced to enter said passage than if the walls were square and not funnel-shaped.

The attachment for drowning the imprisoned animals consists of a casing 13, which is adapted to inclose compartment 1 and project far enough beyond the partition to prevent the animals from projecting their noses through the wires of said partition, and thereby preventing drowning when they are placed beneath the water. This casing is secured in position by hooks 14, carried by the trap, engaging the eyes 15, formed in said casing. Before the casing is positioned upon the trap the hook 16, carried by the trap, is moved to engage the gate, so that it is prevented from swinging open when the trap is turned up on its ends preparatory to filling the same with water. It will be seen that when water is poured within the casing the animals imprisoned within the compartment 1 will be drowned.

From the above description it will be seen that I have produced a trap which is very simple in its construction and which is so constructed as to induce the animals to enter the same and to serve to remove their fear and also an attachment for said trap which may be readily attached or detached from the same for the purpose of drowning the imprisoned animals.

Having thus described my invention, what I claim as new, and desire to secure by Letters Patent, is—

1. An animal-trap comprising a compartment, an inner casing supported within said compartment and extending transversely of the same and having open ends and formed with an opening intermediate of its ends, a partition dividing said casing and located across said opening, and a passage-way leading downwardly from said opening and terminating a short distance from the bottom of said compartment.

2. An animal-trap consisting of two compartments, a communication between said compartments, a gate controlling said communication, an inner casing supported within one of said compartments and extending transversely of the same, said casing opening at its ends through the end walls of said compartment, a communication between the bottom wall of said casing and the compartment in which it is located, a partition dividing said casing, said partition extending across the center of the opening, and a downwardly-extending casing secured at its upper end to said opening and having its walls converging toward their lower ends, the lower end of said walls terminating a short distance from the bottom of the compartment, substantially as set forth.

3. A trap comprising two compartments, a communication between said compartments, a plate secured to the bottom wall of the compartments adjacent the communication, a gate adapted to close said communication, said gate inclining downwardly and having its lower end adapted to engage the plate, a transversely-extending casing supported within one of said compartments and opening at its ends through the end walls thereof, said end walls being inclined inwardly toward the open ends of the inner casing, a communication between said inner casing and the compartment in which it is located, a casing secured at its upper end to the opening and depending therefrom, said casing having its walls converging toward their lower ends and terminating short of the bottom wall of the compartment, and an obstruction within the inner casing, said obstruction extending across the center of the communication, substantially as set forth.

4. The combination with an animal-trap having two compartments therein, formed by a dividing-partition extending transversely, of a casing adapted to contain water in which one end of said trap is adapted to fit, and hooks on said casing for securing the trap in place therein, the upper ends of the sides of said casing projecting above said partition when the trap is in place.

5. An animal-trap comprising two compartments, a communication between said compartments, a gate controlling said communication, one of said compartments being enlarged, a door for the opposite compartment, a transversely-extending passage-way formed within the enlarged compartment and opening through the end walls thereof, said end walls being inclined inwardly toward the open ends of the passage-way, a communication between the passage-way and the lower portion of the compartment, a casing secured about said communication and depending therefrom, said casing having its walls converging adjacent their lower ends and terminating short of the bottom wall of the compartment, and a partition within the passage-way, said partition dividing the communication, substantially as set forth.

In testimony whereof I have signed this specification in the presence of two subscribing witnesses.

JEPTHA L. FARLEY.

Witnesses:
L. W. NIMMO,
LOUISE F. SUDDICK.